United States Patent [19]

Gartner et al.

[11] 4,289,921
[45] Sep. 15, 1981

[54] ELECTRICAL ACTIVATING ASSEMBLY AND CLOSURE MEMBER THEREFOR

[75] Inventors: Rodney W. Gartner; Charles R. Gray, both of Coraopolis; John O. Hazen, Monaca, all of Pa.

[73] Assignee: H. H. Robertson Company, Pittsburgh, Pa.

[21] Appl. No.: 107,350

[22] Filed: Dec. 26, 1979

[51] Int. Cl.³ ............................................... H02G 3/12
[52] U.S. Cl. ...................................... 174/48; 174/67; 339/44 M
[58] Field of Search ....................... 174/48, 49, 67, 57; 52/221; 220/242, 3.7; 339/36, 43, 44 R, 44 M; 16/171

[56] References Cited

U.S. PATENT DOCUMENTS

| Re. 7011 | 3/1876 | Plumer | 16/171 X |
|---|---|---|---|
| 2,033,602 | 3/1936 | Adam | |
| 2,996,566 | 8/1961 | Stas | |
| 3,027,416 | 3/1962 | Kissel | |
| 3,064,850 | 11/1962 | Kelly | |
| 3,932,696 | 1/1976 | Fork et al. | |
| 3,956,573 | 5/1976 | Myers et al. | |
| 3,972,579 | 8/1976 | Kohaut | |
| 4,041,238 | 8/1977 | Penczak | |
| 4,044,908 | 8/1977 | Dauberger | |
| 4,054,222 | 10/1977 | Suk | |
| 4,096,347 | 6/1978 | Penczak et al. | 174/48 |

FOREIGN PATENT DOCUMENTS

| 673746 | 11/1963 | Canada | 174/48 |
|---|---|---|---|
| 1465346 | 4/1969 | Fed. Rep. of Germany | |
| 50877 | 11/1966 | German Democratic Rep. | 339/44 R |

Primary Examiner—Gene Z. Rubinson
Assistant Examiner—D. A. Tone
Attorney, Agent, or Firm—George E. Manias

[57] ABSTRACT

An electrical activating assembly provides a flush-with-the-surface electrical receptacle. The assembly includes a closure member providing access to a simplex or duplex receptacle supported by a support plate substantially flush with a barrier upper surface. The closure member includes a perimeter bead extending upwardly from the member upper face to provide a cover socket. A cover fitting within the cover socket is pivotally and removably connected to the perimeter bead for access to the receptacle. An alternative closure member is disclosed for use with a high voltage simplex receptacle. A cover fits within the cover socket, is secured to the receptacle, and includes an access opening exposing the outlet.

23 Claims, 23 Drawing Figures

ELECTRICAL ACTIVATING ASSEMBLY AND CLOSURE MEMBER THEREFOR

BACKGROUND OF THE INVENTION

1. Field of the Invention

This invention relates to electrical activating assemblies, and more particularly to an electrical activating assembly and closure member therefor providing ready access to a receptacle supported substantially flush with the barrier upper surface.

2. Description of the Prior Art

A variety of devices has heretofore been provided including means for mounting an electrical receptacle flush with a surface, such as that of a floor. The device may include:

(a) a removable disk-type closure protecting a subjacent plug receptacle, see for example U.S. Pat. Nos. 2,033,602 (ADAM), 3,027,416 (KISSEL), 3,064,850 (KELLY, JR.);

(b) a closure having a cover pivotal about a horizontal axis, which protects a subjacent plug receptacle, see for example U.S. Pat. No. 2,996,566 (STAS) and West German Pat. No. 1,465,346;

(c) a closure member having a pair of caps covering the outlets of a duplex receptacle—each cap being pried upwardly and pivoted about a vertical axis away from the outlet, see for example U.S. Pat. No. 3,956,573 (MYERS);

(d) a pivotal cover having a receptacle support attached thereto and pivotal therewith, see for example U.S. Pat. No. 3,972,579 (KOHAUT); and (e) a one-piece or two-piece cover adapted for snap-fit engagement with a support, see for example U.S. Pat. Nos. 3,932,696 (FORK et al); 4,041,238 (PENCZAK); 4,044,908 (DAUBERGER); and 4,054,222 (SUK).

While the above-identified devices perform their intended function, they are either unsightly or require a tool for gaining access to the plug receptacle, consist of numerous components and are therefore relatively expensive to manufacture.

In underfloor access housings such as disclosed in the FORK et al and PENCZAK patents, supra, the cover must be removed prior to making an electrical plug connection; and the cover must be replaced after the plug connection is made. Thus a normal one-step plug-in connection is not possible. In addition all plug connections are made within the relatively confined space offered by the access housing. The confined space precludes the installation of a multi-plug-in unit which converts the single outlet to plural outlets. Thus prior underfloor access housings do not offer the normal one-step plug-in connections or readily accessible outlets or the capability of converting each single outlet to plural outlets.

Fire-resistant floor structures are known which incorporate underfloor access housings such as disclosed in the FORK et al, KOHAUT and PENCZAK patents, supra. In order to make temporary electrical connections and relatively permanent electrical connections, a hole must be cut in the cover for each exiting wire. As is known, the fire resistance (fire rating) of a floor structure normally is determined with one or more of the access housings in an activated condition, that is, with exiting wires in place. Where temporary electrical connections are broken, the cover must be replaced if the fire rating is to be retained. Consequently, prior underfloor access housings present the further disadvantage of requiring replacement of covers each time a temporary electrical connection is broken.

SUMMARY OF THE INVENTION

The principal object of this invention is to provide an activating assembly supporting an electrical receptacle substantially flush with the outer surface of a barrier thereby offering the normal one-step plug-in.

Another object of the invention is to provide an assembly including a closure member having a cover for each outlet of the receptacle—each cover being pivotally supported for access to the outlet and being removable to accommodate large size accessory units.

Still another object of this invention is to provide a closure member having a raised perimeter bead surrounding the receptacle, which is exposed at an opening in a decorative coating, such as a carpet—the perimeter bead protecting the carpet edges at the perimeter of the opening against unraveling.

A further object of this invention is to provide an activating assembly including a closure member which does not detract from the aesthetic appearance of the decorative covering.

A still further object of this invention is to provide an improved floor structure wherein temporary electrical connections can be made and broken without affecting the fire-resistance of the floor structure.

In accordance with one embodiment, the closure means comprises a plate having perimeter edges, a plate outer surface and a plate inner surface. An access opening is provided between the bilateral axis of the plate and one of the perimeter edges. A perimeter bead surrounds the access opening and is inset from the perimeter edges. The bead extends outwardly from the plate outer face and forms therewith a cover socket. A cover is provided fitting within the cover socket. Connecting means connects one end of the cover to the perimeter bead for pivotal movement between a capping position covering the access opening and an upstanding position exposing the access opening. The connecting means also permits removal of the cover when desired.

In accordance with a second embodiment, the plate has a plate opening disposed centrally within the cover socket and of a size sufficient to pass an electrical receptacle of the type having a single outlet. A cover is provided having a central access opening in which the single outlet is intended to reside and which fits within the cover socket. A first fastener-receiving aperture is provided in the plate, adapting the plate for securement to structure subjacent to the plate inner surface. Second fastener-receiving openings are provided in the cover, adapting the cover for securement to the electrical receptacle.

The present invention also provides an improved activating assembly for use with an electrical distribution system to provide an electrical receptacle at the outer surface of a barrier. The assembly includes rim means presenting a rim opening; a support means adapted to support the electrical receptacle; either of the above-described closure means capping the rim opening and providing access to the electrical receptacle; and fastening means securing the closure means to the support means.

The present invention also provides improvements in a barrier of the type including a layer of settable material presenting a barrier outer surface; a chamber in the barrier including a barrier opening at the barrier outer surface; an electrical receptacle presenting at least one outlet; support means supporting the receptacle within the barrier opening and proximate to and substantially parallel with the barrier outer surface; the above-described activating assembly incorporating either of the above-described improved closure means; fastening means securing the closure means to the support means; and a decorative covering overlying the barrier outer surface and that portion of the cover member outer face presented exteriorly of the perimeter bead. In the completed barrier, the electrical receptacle is substantially flush with the floor upper surface and is readily accessible for temporary one-step plug-in connections.

The barrier may comprise a fire-resistant floor structure of the type including cellular units providing generally parallel enclosed cells each having an opening presented in the chamber. Fireproofing is applied to provide the floor structure with a desired fire-resistance. In the present closure member, the one-step plug-in connections do not require modification of the closure member. The connections are made without affecting the established fire-resistance of the floor structure.

DESCRIPTION OF THE PREFERRED EMBODIMENTS

Figures 1, 2, 7, 8:
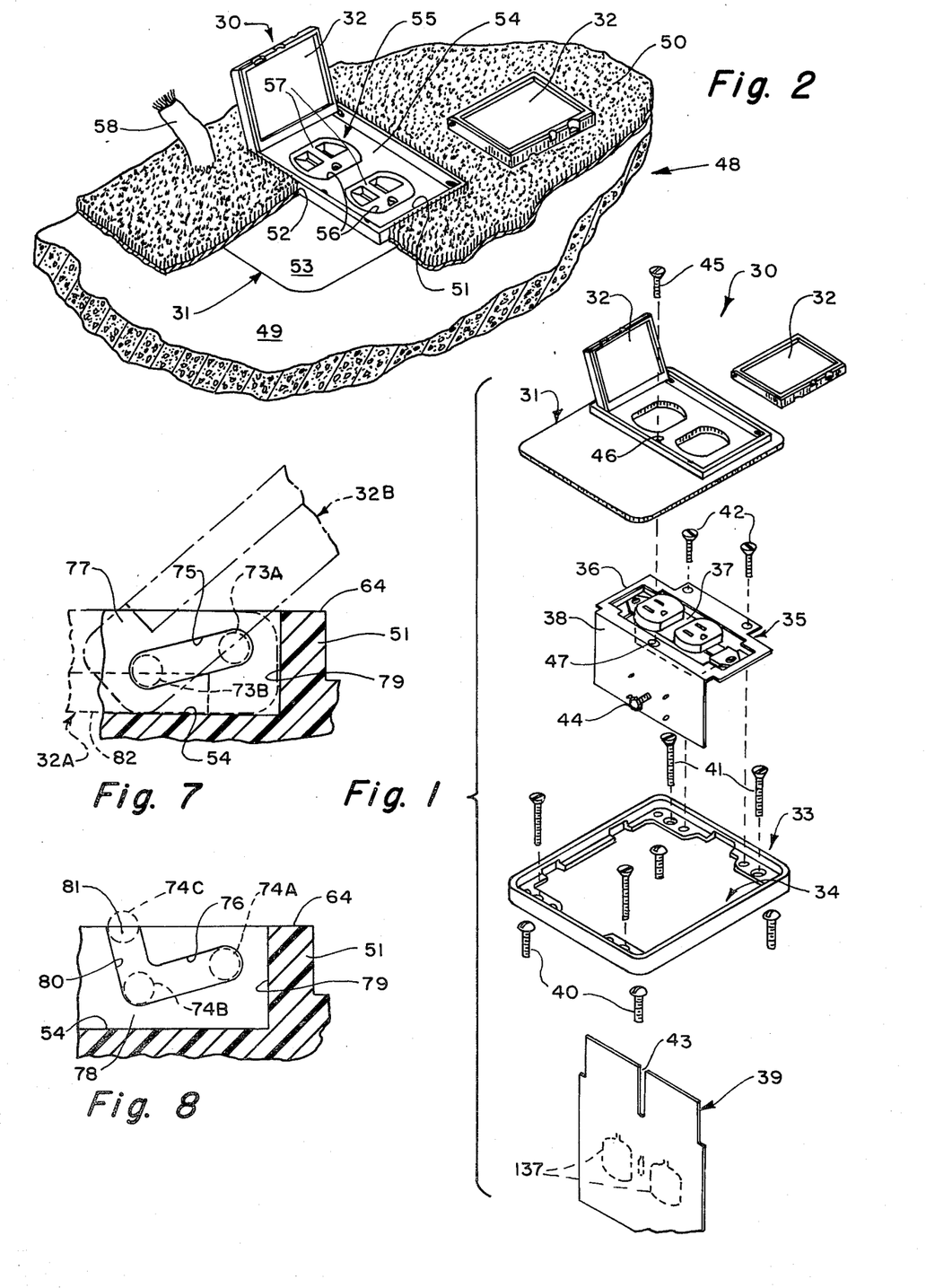
FIG. 1 is an exploded isometric view of an activating assembly of this invention.
FIG. 2 is a fragmentary isometric view illustrating a barrier incorporating the assembly of FIG. 1.
FIG. 7 is a fragmentary cross-sectional view illustrating a recess of closed periphery.
FIG. 8 is a fragmentary cross-sectional view illustrating a recess having an open end.

The present invention provides an activating assembly 30 illustrated in FIG. 1. The assembly 30 includes a closure member 31 having covers 32 pivotally connected thereto and removable therefrom; rim means 33 providing a rim opening 34; support means 35 including a support plate 36 adapted to support a single or duplex receptacle 37, and a plate element 38 formed integrally therewith and extending downwardly therefrom; and a partition element 39 which cooperates with the plate element 38. Leveling screws 40 are provided which are threadedly engaged with a substructure (not illustrated). The rim means 33 is supported on the heads of the leveling screws 40 and is secured to the substructure by hold-down screws 41. When assembled, the support means 35 is presented in the rim opening 34 with the plate element 38 extending downwardly therefrom. The support means 35 is supported in part by the rim means 33 and is secured thereto by fasteners 42. The partition element 39 has a slot 43 receiving a fastener 44 which is threadedly engaged with the plate element 38. The fastener 44 and slot 43 permit adjusting the the position of the partition element 39 relative to the plate element 38. The closure member 31 is secured to the support means 35 by a fastener 45 which passes through a fastener-receiving opening 46 in the closure member 31 and is threadedly engaged in an opening 47 in the support plate 36.

The activating means 30 may be installed in a barrier such as a wall or floor structure. FIG. 2 illustrates a fragment of a barrier 48 having a barrier outer surface 49 covered by a decorative covering, such as a carpet 50. Only a closure member 31 is visible at the barrier outer surface 49. The closure member 31 has a perimeter bead 51 projecting outwardly through an opening 52 in the carpet 50. The carpet edges at the perimeter of the opening 52 fit snugly against the bead 51 and are protected against unraveling. The closure member 31 has a member outer face 53 which is substantially flush with the barrier outer surface 49. The outer face of that portion of the member outer face 53 presented interiorly of the bead 51 cooperates with the bead 51 to form a cover socket 55. At least one access opening 56 (two access openings being illustrated) is provided within the cover socket 55. An outlet 57 of the electrical receptacle 37 is presented in each opening 56. The outlets 57 are substantially flush-mounted with respect to the barrier outer surface 49 and are readily accessible for electrical plug connections. Each access opening 56 has a cover 32 associated therewith which is connected to the perimeter bead 51 for pivotal movement between a capping position (not illustrated) and an upstanding position. Each cover 32 may also be removed to facilitate connecting a large size accessory unit, such as an AC adapter or a multi-plug-in unit to one of the outlets 57. A multi-plug-in unit converts the single outlet 57 to a multiple outlet thereby increasing the number of available electrical connections which may be made. The closure member 31 also is adapted to pass a multi-conductor telephone cable 58 as will be described.

CLOSURE MEMBER 31

Referring to FIGS. 3 to 6, the closure member 31 comprises a generally rectangular plate 59 preferably formed from any suitable heat-resistant moldable plastic materials capable of withstanding temperatures of up to 400° F. (204° C.). Examples of suitable plastic materials include acetal resin compositions, thermoplastic polyester compositions and the like. The plate 59 has perimeter edges including opposite sides 60, opposite ends 61. The plate 59 presents the plate outer surface 53 including the outer surface portion 54, and a plate inner face 62. The access openings 56 are offset from the bilateral axis 63 (FIG. 3) of the plate 59 and thus reside in one-half of the plate 59. The perimeter bead 51—serving as a fence—surrounds the access opening 56 and is inwardly inset from the perimeter edges. The bead 51 extends outwardly from the plate outer face 53 and presents a bead outer surface 64 which is outwardly spaced from the plate outer face 53. The fastener-receiving opening 46 preferably is provided within the cover socket 55, so that the fastener 45 (FIG. 1) will be entirely hidden from view when the covers 32 are in the capping position.

It will be observed in FIG. 4 that the outer face portion 54 within the cover socket 55 is depressed below the level of the plate outer face 53. The arrangement is such that when in the capping position illustrated in FIG. 15, the covers 32 will be substantially flush with the bead outer surface 64.

Figure 15:
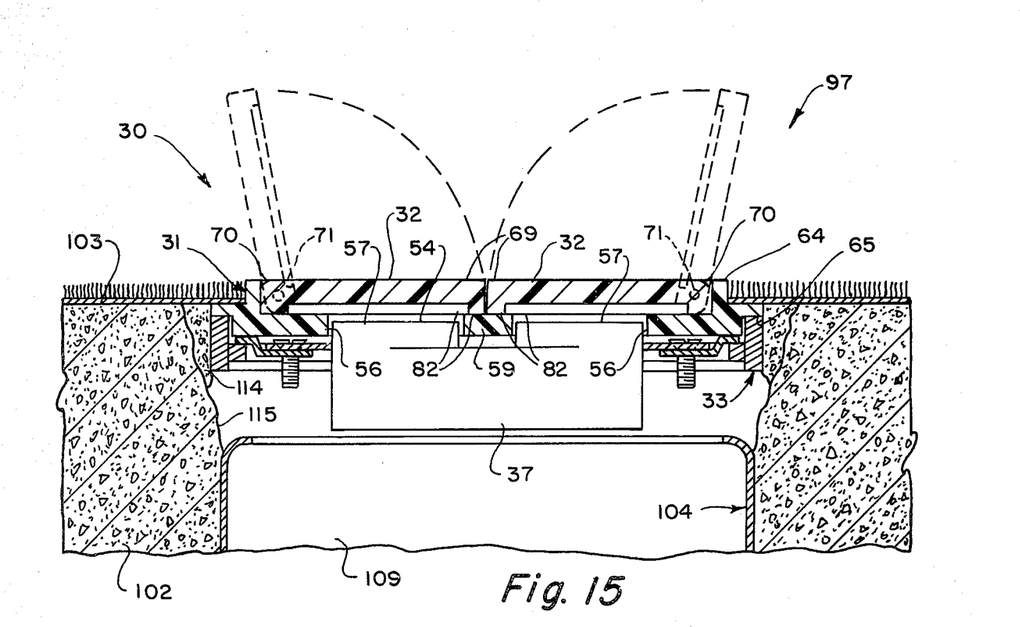
FIG. 15 is a cross-sectional view taken along the line 15—15 of FIG. 14.

The plate 59 includes a perimeter inner surface 65 (FIGS. 4, 5) at a level between the plate outer and inner faces 53, 62. As shown in FIG. 15, the perimeter inner surface 65 overlies and completely hides the rim means 33.

The plate 59 is provided with weakened areas 66 (FIG. 3) which may be cut to the desired size in the field to accommodate passage of the telephone cable 58 (FIG. 2). Splayed flanges 64 are provided which depend from the plate inner face 62. The splayed flanges 67 serve as means for connecting a block 68 (FIG. 14) of thermal insulation to the inner face 62 of the plate 59.

COVERS 32

Figures 3, 4, 5, 10, 11:
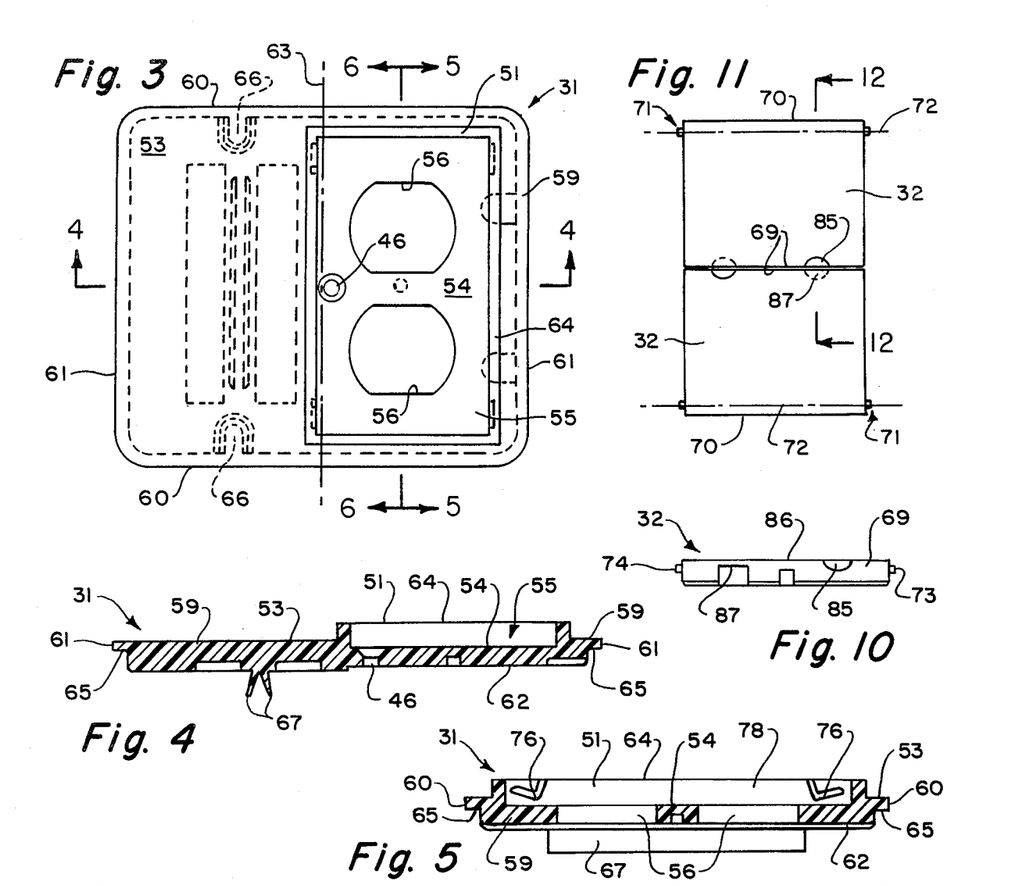
FIG. 3 is a plan view of the closure member of FIG. 2.
FIG. 4 is a cross-sectional view taken along the line 4—4 of FIG. 3.
FIG. 5 is a cross-sectional view taken along the line 5—5 of FIG. 3.
FIG. 10 is an end elevation view of the cover of FIG. 9.
FIG. 11 is a plan view of two covers of FIG. 9 arranged in end-abutted relation.
Figure 6:
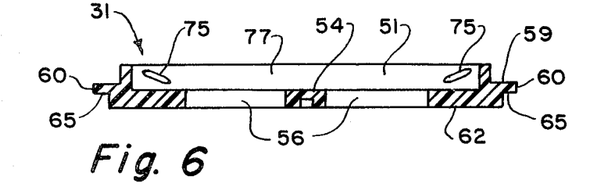
FIG. 6 is a cross-sectional view taken along the line 6—6 of FIG. 3.

When in the capping position illustrated in FIGS. 11, 15, the covers present confronting ends 69 and remote ends 70. Connecting means 71, one for each cover 32, are provided which connect the remote ends 70 to the perimeter bead 55 for pivotal movement about separate axes 72 (FIG. 11). The covers 32 (FIG. 15) are pivotal between the capping position illustrated in full lines and an upstanding position illustrated in dotted outline.

Each of the connecting means 71 includes first and second pins 73, 74 (FIGS. 9, 11) which extend coaxially from opposite sides of the cover 32 and define the axis 72; and recesses 75, 76 (FIGS. 5, 6) one formed in each of opposed interior faces 77, 78 of the perimeter beads 51—each of the recesses 75, 76 receiving one of the pins 73, 74.

Referring to FIG. 7, the recess 75 is of closed periphery and is adapted to captively retain the first pin 73. The recess 75 is inclined from the outer face portion 54 upwardly toward the bead outer surface 64 and toward the interior face 79 of the adjoining portion of the perimeter bead 51. The cover 32 and the first pin 73 are shown in two alternative positions (suffix A, B) corresponding to the capping position (dotted outline) and the upstanding position (dash-dot outline). The first pin 73A resides in the upper end of the recess 75 when the cover is in the capping position. When the cover 32B is raised to the upstanding position, the first pin slides along the recess 75 and resides in the lower end thereof.

Referring to FIG. 8, the recess 76 communicates with a recess extension 80 having an open end 81 at the bead upper surface 64. The open end 81 permits passage of the second pin 74C during removal and installation of the cover. For example, comparing FIGS. 7 and 8, the cover is installed by inserting the pin 73B into the lower end of the recess 75. The pin 74C is introduced through the open end 81 and travels along the recess extension 80 to the lower end of recess 75. The first and second pins 73B, 74B remain in the lower ends of the recesses 75, 76 while the cover 32 is in the upstanding position and travel to the upper ends of the recesses 75, 76 when the cover 32 is in the capping position. Removal of the cover 32 is accomplished by reversing the above-described procedure.

Figure 9:
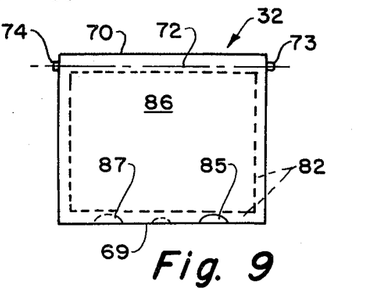
FIG. 9 is a plan view of a cover.
Figure 13:
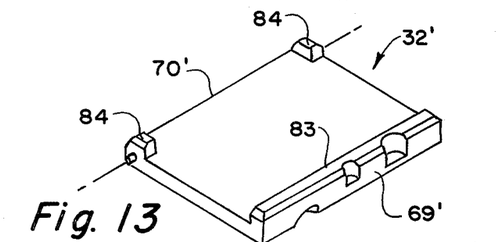
FIG. 13 is an isometric view of the bottom face of a cover illustrating an alternative configuration.

Referring to FIGS. 7, 9, and 11, each cover plate 32 presents an inner perimeter flange 82 which is adapted to engage the outer face portion 54 (FIG. 7). It will be observed in FIGS. 7, 8 that live loads (not illustrated) applied to the cover plates 32 will be sustained solely at the bearing area between the inner perimeter flange 82 and the upper face portion 54. Thus the connections formed between the pins 73, 74 and the recesses 75, 76 are unaffected by applied live loads. As an alternative arrangement, a cover 32' (FIG. 13) may be provided having a front flange 83 at the confronting end 69' and posts 84 at the opposite sides of the remote end 70'.

Figure 12:
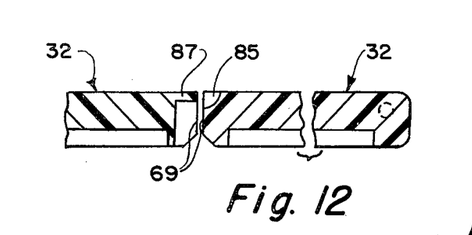
FIG. 12 is a fragmentary cross-sectional view taken along the line 12—12 of FIG. 11.

Means are provided which facilitate raising each cover from the capping position to the upstanding position. A depression 85 (FIGS. 9, 10) is provided adjacent one side of the cover 32 at the juncture of the confronting end 69 and the cover upper face 86; and that a thin-wall segment 87 is provided adjacent the opposite side of the cover 32 at the confronting end 69 and at the cover upper face 86. When the covers 32 are in the capping position (FIGS. 12, 13) each depression 85 is directly opposite to a thin-wall segment 87. Either of the covers 32 may be elevated to the upstanding position by introducing, for example, a fingernail through one of the depressions 85 and beneath the thin-wall segment 87.

BARRIER STRUCTURE

The barrier 48 (FIG. 2) may comprise a fire-resistant floor structure 97 (FIG. 14, 15) incorporating the activating assembly 30 of this invention. Broadly, the floor structure 97 includes spaced-apart enclosed cells 99, 100; cell openings 106, 107, one for each of the cells 99, 100; a covering layer 102 of monolithic concrete; a chamber 105 in the concrete 102 providing access to the cells 99, 100 through the cell openings 106, 107 from the floor upper surface 103; and rim means 33 within the chamber 105 and adjacent to the floor upper surface 103, presenting a rim opening 34. Specifically, a sheet metal unit 98 provides the enclosed cells 99, 100 which are separated by a lengthwise trough 101. The layer 102 of monolithic concrete covers the sheet metal unit 98 and presents the floor upper surface 103. An insert 104 is provided which defines the chamber 105 in the concrete 102 including a portion of the lengthwise trough 101. The insert 104 may be of the type described and claimed in U.S. Pat. No. 3,932,696 which is assigned to the assignee of this invention.

An upstanding partition 108 (FIG. 14) divides the chamber 105 into first and second compartments 109, 110, each communicating with one of the cells 99, 100. The upstanding partition 108 includes the partition element 39 and the plate element 38 of the support means 35. The support plate 36 is supported in part by the partition 108 and in part by the rim means 33 proximate to and substantially parallel with the floor upper surface 103. The electrical receptacle 37 is supported by the support plate 36 within the first compartment 109 and proximate to the floor upper surface 103—the outlets 57 being readily accessible from the floor upper surface 103.

A second receptacle shown in dotted outline at 132 (FIG. 14) may be provided. The second receptacle 132 preferably is mounted on the partition element 39 after removal of the knockouts shown in dotted outline at 137 in FIG. 1. Thus mounted, the second receptacle 132 is accessible from the second compartment 110 for electrical plug connections (not illustrated).

The closure member 31 caps the chamber 105 and is secured to the support plate 36 by the fastener 45. The covers 32, when in the capping position (FIG. 15), cover the access openings 56 and protect the outlets 57. The covers 32 may be individually pivoted about the connection means 71 to the upstanding position (FIG. 14) thereby permitting connection of a plug 111 with one of the outlets 57.

The closure member 31 also permits rapid access to the second compartment for making signal wiring connections and power connections. Removal of the signal positive fastener 45 releases the closure member 31. The telephone cable 58 may be connected to a telephone cable 112 extending through the cell 100 by means of an amphenol connector 113. Thereafter the closure member 31 is reinstalled and secured in place.

This invention provides a floor structure having a flush-mounted receptacle which does not affect the established fire-resistance of the floor structure. The support structure for flush-mounted receptacles enhances radiation, conduction and convection of heat through the floor structure. The attainment of a desired fire-resistance rating is therefore very difficult. The present invention overcomes this difficulty.

It will be observed in FIG. 15 that the perimeter inner surface 65 overlies and completely masks the rim means 33. During fire conditions, the hot rim means 33 is not exposed at the floor surface 103.

It will also be observed in FIG. 15 that a heat-resistant grouting 114 seals the space between the rim means 33 and the opening 115 cut in the concrete 102 to gain access to the insert 104. The grouting 114 precludes egress of heat and smoke from the first and second compartments 109, 110 into the spaced above the floor structure 97.

Figure 14:
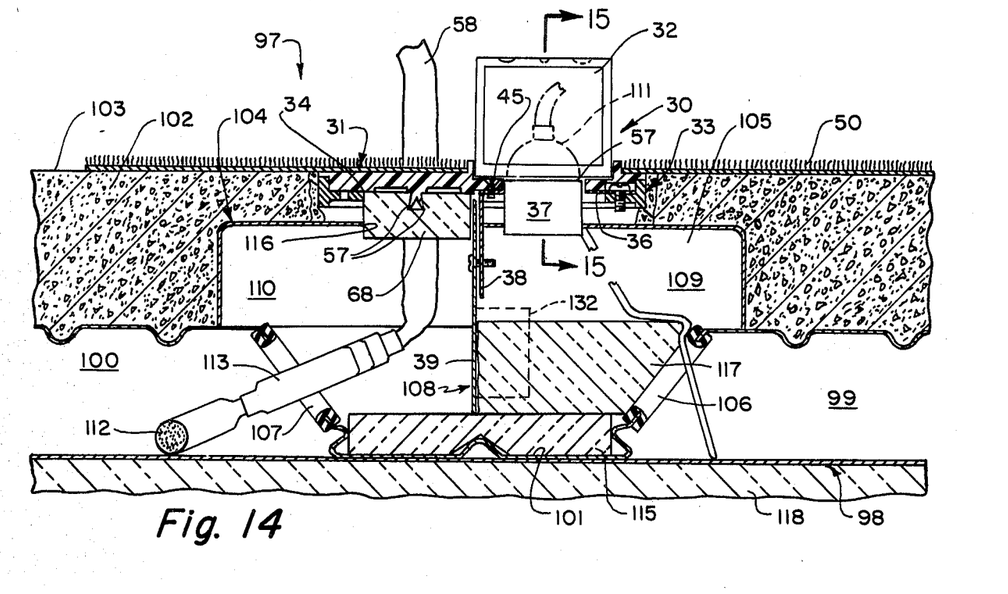
FIG. 14 is a cross-sectional view of an underfloor electrical distribution system incorporating the activating assembly of FIG. 1.

Referring to FIG. 14 through conduction of heat through the partition means 108 to the support plate 36 is minimized as follows. A rigid insulation block 115, such as gypsum board block, is provided in the trough 101 and extends through the first and second chambers 109, 110. The partition means 108—resting on the insulation block 115—is insulated from the metallic portions of the trough 101 and thereby minimizes through-conduction of heat to the support plate 36.

It will be observed in FIG. 14 that the insert 104 presents a top opening 116 providing access to the interiors of the compartments 109, 110. The block 68 of thermal insulation carried at the undersurface of the closure member 31 extends downwardly from the closure member 31 through the opening 116. The block 68 of thermal insulation and the rigid insulation block 115 cooperate to inhibit rapid temperature rise of that portion of the closure means 31 associated with the second compartment 110.

Rapid temperature rise of that portion of the closure member 31 associated within the first compartment 109 is inhibited by the rigid insulation block 115 cooperating with a thermal insulation block 117 which extends between the grommeted opening 106 and the partition means 108. External fireproofing 118 applied to the undersurface of the sheet metal unit 98 completes the fireproofing of the floor structure 97.

It will be observed in FIG. 14 that a temporary electrical connection can be made merely by raising the cover 32 and inserting the plug 111 into the outlet 57. Unlike prior art assemblies, the closure member 31 need not be removed and, further, no physical modification of the closure member 31 is necessary. It will be noted that the temporary connection can be made—and broken—without affecting the established fire resistance of the floor structure 97.

Figures 16, 17, 18, 19:
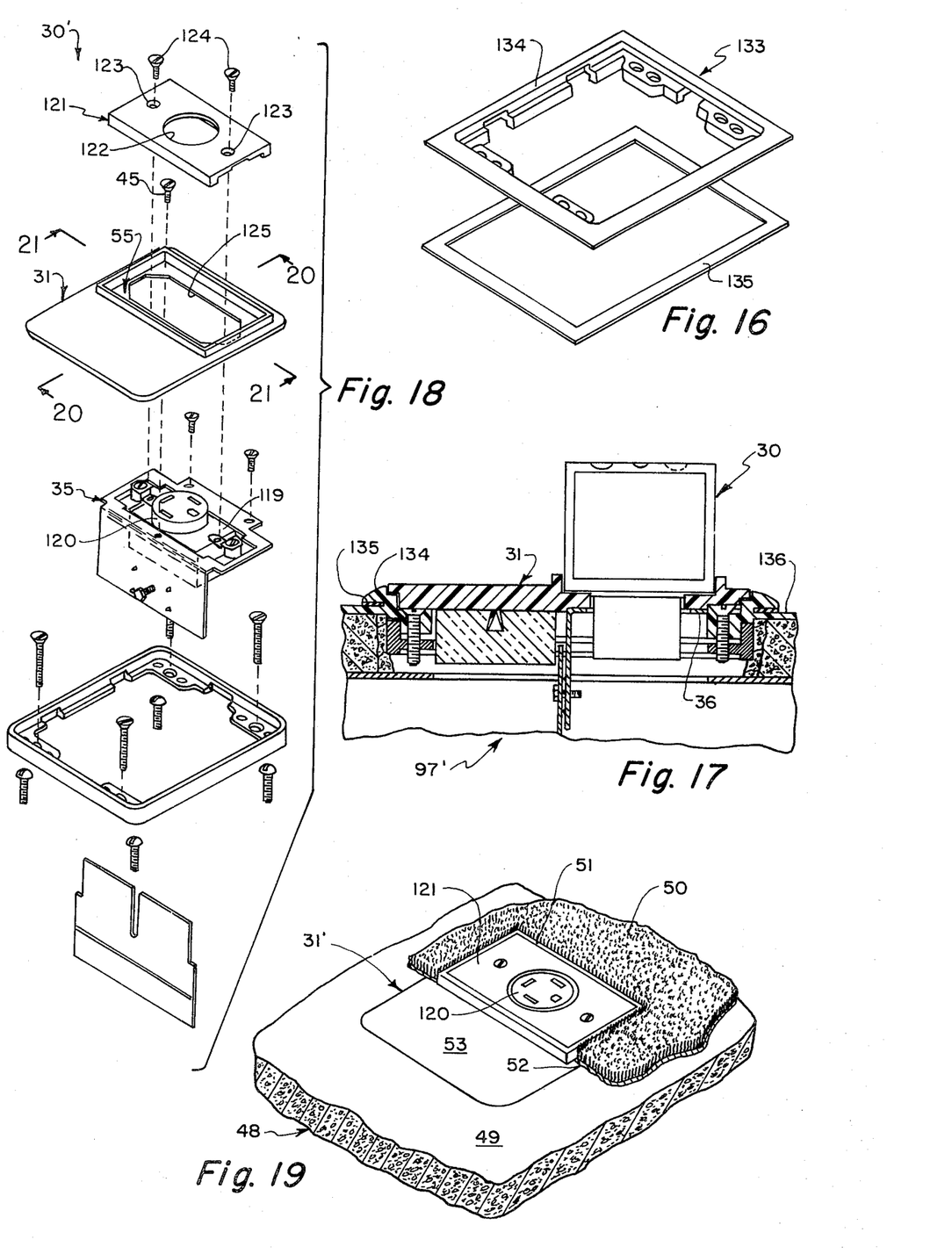
FIG. 16 is an exploded isometric view of a flange ring and a gasket.
FIG. 17 is a fragmentary cross-sectional view, similar to FIG. 14, illustrating the use of the flange ring and the gasket of FIG. 16.
FIG. 18 is an exploded isometric view of an alternative activating assembly of this invention.
FIG. 19 is a fragmentary isometric view, similar to FIG. 1, illustrating a barrier incorporating the activating assembly of FIG. 18.

FIG. 16 illustrates a flange ring 133 presenting a perimeter flange 134, and a gasket 135. The flange ring 133 and gasket 135 adapt the activating assembly 30 (FIG. 17) for use in a floor structure 97' wherein the decorative covering comprises decorative tile 136, such as vinyl tile. When installed, the flange ring 133 supports the closure member 31 and, in part, the support plate 36. The perimeter flange 134 extends over the tile 136. The gasket 135 is compressed between the perimeter flange 134 and the tile 136.

ALTERNATIVE EMBODIMENT

An alternative embodiment of the present activating assembly—designated generally by the numeral 30'—is illustrated in FIGS. 18 through 22. Corresponding numerals will be employed to identify corresponding parts heretofore described.

The activating means 30' (FIG. 18) is particularly adapted for flush-mounted presentation of a high voltage receptacle 119 having a single outlet 120. The receptacle 119 is secured to and supported by the support means 35. The activating assembly 30' includes a modified closure member 31' having an associated cover 121. The closure member 31' is adapted to be secured to the support means 35 by the fastener 45, as described above. The cover 121 has a single access opening 122 for presentation of the outlet 120. The cover 121 has through-openings 123 adapted to receive fasteners 124 which secure the cover 121 directly to the receptacle 119, as will be described. The closure member 31' is provided with a plate opening 125 within the cover socket 55.

FIG. 19 illustrates the closure member 31' installed in the barrier 48'. The closure member 31' has its member outer face 53 substantially flush with the barrier outer face 49. The perimeter bead 51 projects outwardly through the opening 52 in the carpet 50, whereby the outlet 120 is presented in flush-mounted relation with the barrier outer face 49 and is readily accessible for electrical plug connections.

Figure 20:
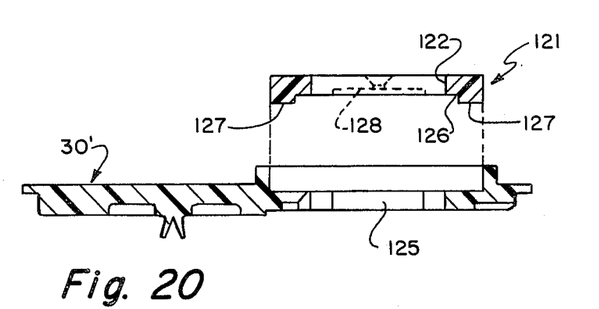
FIG. 20 is a cross-sectional view taken along the line 20—20 of FIG. 19.
Figure 21:
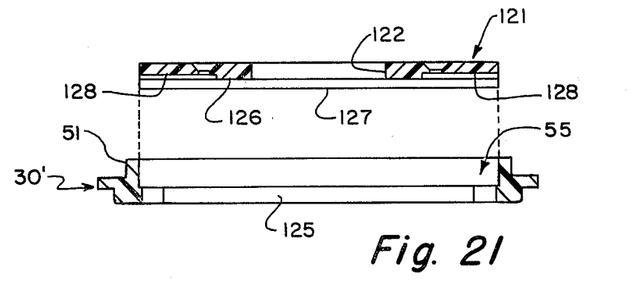
FIG. 21 is a cross-sectional view taken along the line 21—21 of FIG. 19.
Figure 22:
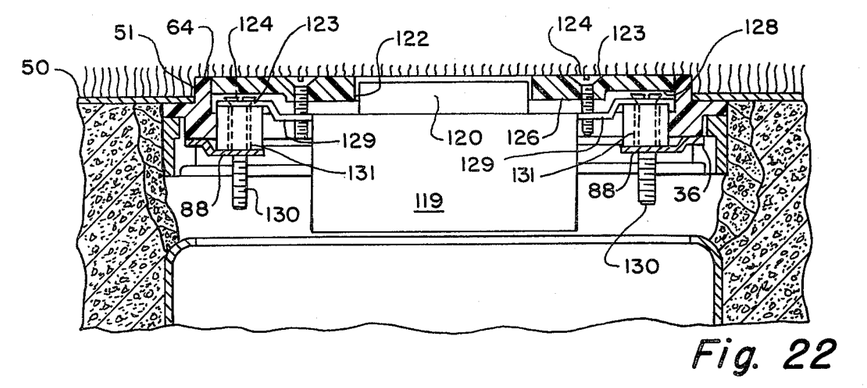
FIG. 22 is a cross-sectional view taken along the line 22—22 of FIG. 23.

Referring to FIGS. 20 through 22, the cover 121 presents a lengthwise depression 126 defined by the inner surfaces of the cover 121 and lengthwise ribs 127 disposed along opposite longitudinal sides of the cover 121. Relief areas 128 are provided at opposite ends of the lengthwise depression 126. The relief areas 128

(FIG. 22) provide clearance for portions of the mounting tabs 129 of the receptacle 119 and for fasteners 130 which secure the receptacle 119 to the ears 88 of the support plate 36. Shims 131 (FIG. 22) are interposed between the mounting tabs 129 and the ears 88 to position the outlet 120 at the proper level with respect to the access opening 122.

It will be observed in FIG. 22 that the fasteners 124 extend through the through-openings 123 in the cover 121 and are threadedly engaged with the mounting tabs 129 of the receptacle 119. The arrangement is such that the outer face of the cover 121 is substantially flush with the bead outer surface 64—the bead 51 and the cover 121 residing below the level of the nap of the carpet 50.

Figure 23:
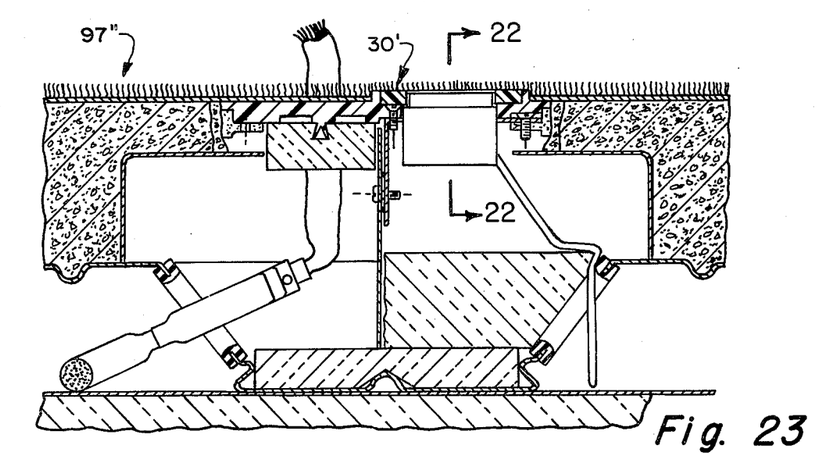
FIG. 23 is a cross-sectional view, similar to FIG. 14, illustrating an underfloor electrical distribution system incorporating the activating assembly of FIG. 19.

FIG. 23 illustrates a fire-resistant floor structure 97″ which incorporates the activating assembly 30′.

The activating assemblies 30 and 30′ have utility in the fire-resistant floor structures 97, 97′ and 97″. It will be appreciated that the assemblies 30 and 30′ also have utility in any wiring distributing systems—fireproofed or not—which incorporate spaced parallel wire-distributing cells. The assemblies 30 and 30′ may be adapted for use with the wire distributing system described, for example, in copending application Ser. No. 874,536 filed on Feb. 2, 1978 and assigned to the assignee of this invention.

We claim:

1. A closure member for an electrical outlet comprising: p1 a plate having perimeter edges, a plate outer face and a plate inner face;
    an access opening in said plate disposed between the bilateral axis of said plate and one of said perimeter edges;
    a perimeter bead surrounding said access opening and being inwardly inset from said perimeter edges, said perimeter bead extending outwardly from said plate outer face and having a bead outer surface remote from said plate outer face, a portion of said plate outer face being enclosed by said perimeter bead;
    a cover socket formed by said portion and said perimeter bead; and
    a cover fitting within said cover socket and being supported thereby substantially flush with said bead outer surface.

2. The closure member of claim 1 including
    a second access opening adjacent to and on the same side of the bilateral axis as the first said access opening and within said cover socket; and
    a second cover fitting within said cover socket and supported thereby substantially flush with said bead outer surface, the first said cover and said second cover presenting confronting ends and remote ends.

3. The closure member of claim 1 or 2 including
    connecting means connecting each said cover to said perimeter bead for pivotal movement between a capping position covering said access opening and an upstanding position exposing said access opening.

4. The closure member of claim 3 wherein each said connecting means comprises
    first and second pins extending coaxially from opposite sides of said cover; and
    recesses, one formed in each of opposed interior faces of said perimeter bead, each of said recesses receiving one of said pins.

5. The closure member of claim 4 wherein one of said recesses has an open end at said bead outer surface permitting passage of one of said pins during removal and installation of the cover.

6. The closure member of claim 3 wherein said plate includes a fastener-receiving aperture provided within said cover socket.

7. The closure member of claim 3 wherein one said connecting means is provided at each of said remote ends.

8. The closure member of claim 1 or 2 wherein said plate is provided with
    a removable weakened area on that side of the bilateral axis opposite said access opening.

9. The closure member of claim 1 including:
    a central access opening in said cover; and
    second fastener-receiving openings in said cover adapting said cover for securement to structure adjacent to said plate inner face.

10. The closure member of claim 9 wherein said cover has a lengthwise depression in the undersurface thereof confronting that portion of said plate outer face within said cover socket.

11. An assembly for use with an electrical distribution system to provide an electrical receptacle substantially flush with the outer surface of a barrier, said assembly including rim means presenting a rim opening, support means adapted to support an electrical receptacle, and closure means for capping said rim opening, said closure means comprising:
    a substantially flat plate covering said rim opening and having perimeter edges and a plate outer face to be disposed flush with the outer surface of the barrier with which the assembly is used and a plate inner face, said plate having an access opening between the bilateral axis of said plate and one of said perimeter edges providing access to the outlet of the receptacle to be supported by said support means, and a perimeter bead surrounding said access opening, said perimeter bead extending outwardly from said plate outer face and having a bead outer surface remote from said plate outer face, a portion of said plate outer face being enclosed by said perimeter bead;
    a cover socket formed by said portion and said perimeter bead;
    a cover fitting within said socket and supported thereby substantially flush with said bead outer surface; and fastening means for securing said plate to said support means.

12. The assembly of claim 11 including a second access opening adjacent to and on the same side of the bilateral axis as the first said access opening and within said cover socket; and
    a second cover fitting within said cover socket and supported thereby substantially flush with said bead outer surface, the first said cover and said second cover presenting confronting ends and remote ends.

13. The assembly of claim 11 or 12 including:
    connecting means connecting each said cover to said perimeter bead for pivotal movement between a capping position covering said access opening and an upstanding position exposing said access opening.

14. The assembly of claim 13 wherein said connecting means comprises:

first and second pins extending coaxially from opposite sides of said cover; and elongated recesses, one formed in each of opposed interior surfaces of said perimeter bead, each of said recesses receiving one of said pins.

15. The assembly of claim 14 wherein one of said recesses has an open end at said bead outer surface permitting passage of one of said pins during removal and installation of said cover.

16. The assembly of claim 13 wherein said fastening means includes:

an aperture in said plate within said cover socket; and a fastener extending through said aperture for threadedly engaging said support means.

17. The assembly of claim 11 or 12 wherein said plate is provided with a removable weakened area on that side of the bilateral axis opposite said access opening.

18. The assembly of claim 11 including:

a central access opening in said cover; and second fastener-receiving openings in said cover adapting said cover for securement to structure adjacent to said plate inner face.

19. The assembly of claim 18 wherein said cover has a lengthwise depression in the undersurface thereof confronting that portion of said plate outer face within said cover socket.

20. A barrier including a layer of settable material presenting a barrier outer surface; a chamber in said barrier including a barrier opening at said barrier outer surface; an electrical receptacle presenting at least one outlet; support means supporting said receptacle within said barrier opening and proximate to and substantially parallel with said barrier outer surface; and closure means supported in capping relation with said barrier opening and providing access to said receptacle; said closure means comprising:

a plate having perimeter edges and a plate outer face substantially flush with said barrier outer surface, said plate including an access opening between the bilateral axis of said plate and one of said perimeter edges providing access to said outlet, and a perimeter bead surrounding said access opening, said perimeter bead extending outwardly from said plate outer face and having a bead outer surface remote said plate outer face, a portion of said plate outer face being enclosed by said perimeter bead;

a cover socket formed by said portion and said perimeter bead;

a cover fitting within said socket and being supported thereby substantially flush with said bead outer surface;

fastening means securing said plate to said support means; and a decorative covering overlying said barrier outer surface and that portion of said plate outer face presented exteriorly of said perimeter bead.

21. The barrier of claim 20 including connecting means removably connecting said cover to said perimeter bead for pivotal movement about an axis parallel with said plate outer face between a capping position covering said access opening and an upstanding position exposing said access opening.

22. The barrier of claim 20 or 21 wherein said fastening means includes:

an aperture in said plate within said cover socket; and a fastener extending through said aperture and threadedly engaged with said support means.

23. The barrier of claim 20 wherein said plate is provided with a removable weakened area on that side of the bilateral axis opposite said access opening.

* * * * *